Patented Nov. 7, 1922.

1,434,983

UNITED STATES PATENT OFFICE.

WILHELM BAUER AND ALFRED HERRE, OF OPLADEN, NEAR COLOGNE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

VAT DYESTUFFS.

No Drawing. Application filed February 2, 1922. Serial No. 533,649.

*To all whom it may concern:*

Be it known that we, WILHELM BAUER and ALFRED HERRE, citizens of Germany, residing at Opladen, near Cologne-on-the-Rhine, Prussia, Germany, have invented new and useful Improvements in Vat Dyestuffs, of which the following is a specification.

We have found that new and valuable vat dyestuffs can be obtained by condensing 2.1-naphthooxythiophene with isatins e. g. halogenated isatins, such as 5.7-dihalogenated isatins.

The reaction proceeds most probably e. g. in accordance with the following equation:

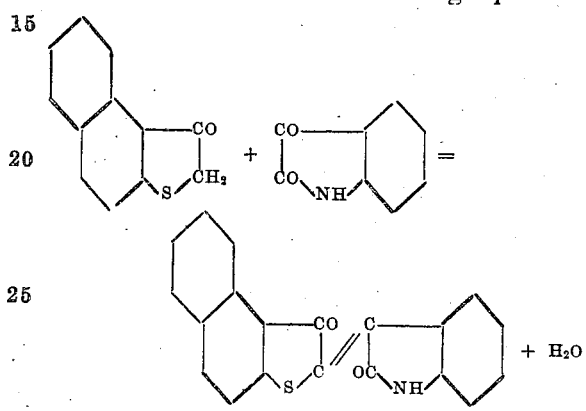

The new dyes are in a dry state reddish-brown crystals with a metallic lustre which are soluble in hot nitrobenzene with a reddish-brown coloration. They yield with hydrosulfite and caustic soda solution yellow vats dyeing cotton after exposure to air brown shades fast to chlorin and to light.

In order to illustrate the new process more fully the following example is given, the parts being by weight: 220 parts of 5.7-dichlorisatin are dissolved in 5000 parts of hot glacial acetic acid, a solution of 200 parts of 2.1-naphthooxythiophene in 500 parts of glacial acetic acid and then 100 parts of concentrated hydrochloric acid are added. The resulting mixture is heated during one hour on the water bath. The dyestuff which has separated is filtered off after cooling, washed and dried.

It has most probably the following formula:

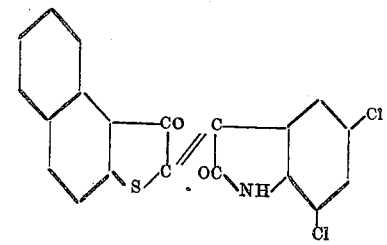

crystallizes in brown needles having a metallic lustre which are difficultly soluble in concentrated sulfuric acid with a reddish-violet coloration and easily soluble in monohydrated sulfuric acid with a bluish-violet coloration. It dyes cotton from the hydrosulfite vat in brown shades fast to chlorin, washing and light.

On using isatin or 5.7-dibromoisatin instead of 5.7-dichloroisatin products are obtained capable of dyeing cotton in brown shades.

We claim:—

1. The new products being vat dyestuff derivable from 2.1-naphthooxythiophene and an isatin compound, which dyes are in a dry state reddish-brown crystals with a metallic lustre soluble in hot nitrobenzene generally with a reddish-brown coloration; and which yield with hydrosulfite and caustic soda lye vats dyeing cotton brown shades remarkable for their fastness to chlorin and to light, substantially as described.

2. The new product having most probably the formula:

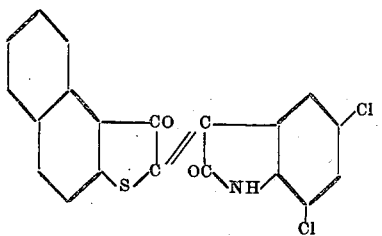

being a vat dye derivable from 5.7-dichloroisatin and 2.1-naphthooxythiophene, which is in dry state a brown crystallin powder with a metallic lustre, soluble in concentrated sulfuric acid with a reddish-violet coloration and in monohydrated sulfuric acid with a bluish-violet coloration, and dyeing cotton from the hydrosulfite vat in brown shades fast to chlorin, washing and light, substantially as described.

In testimony whereof we have hereunto set our hands in the presence of two subscribing witnesses.

WILHELM BAUER.
ALFRED HERRE.

Witnesses:
 ERIC ROUDEY,
 WALLER BRAUN.